UNITED STATES PATENT OFFICE.

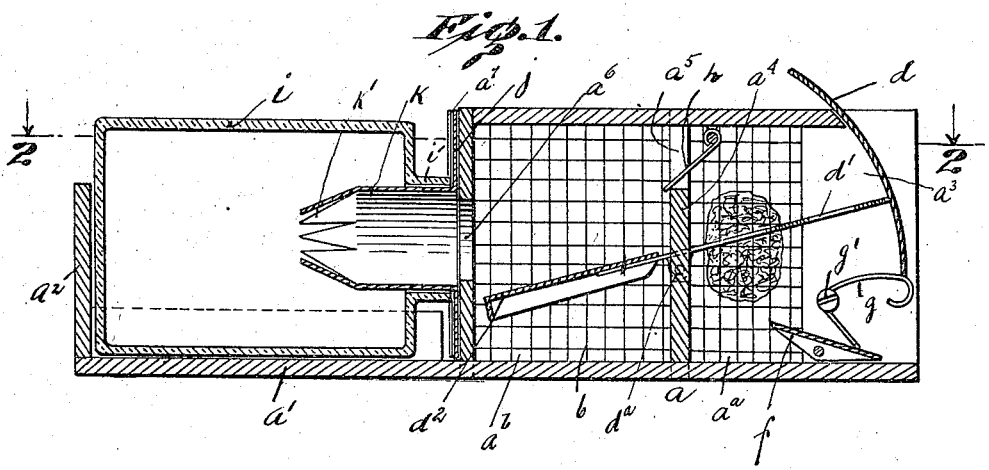

CHARLES GOESSLER, OF BROOKLYN, NEW YORK.

ANIMAL-TRAP.

1,184,443.

Specification of Letters Patent.

Patented May 23, 1916.

Application filed April 15, 1915. Serial No. 21,532.

*To all whom it may concern:*

Be it known that I, CHARLES GOESSLER, citizen of the United States of America, residing at Brooklyn, in the county of Kings and State of New York, have invented certain new and useful Improvements in Animal-Traps, of which the following is a specification.

The present invention relates to animal traps, particularly for mice, and has for its object to provide a simple, inexpensive and efficient construction.

Another object of my invention is to provide a trap of such structure that the removal of the trapped animal can be easily effected without causing nauseousness.

To accomplish these objects, my invention consists in the construction, arrangement and combination of parts, as will be hereinafter fully specified in the appended claims.

In the accompanying drawing in which similar reference characters denote corresponding parts, Figure 1 is a vertical longitudinal section of the trap; Fig. 2 is a horizontal section on line 2—2 of Fig. 1 and Fig. 3 is a front view thereof.

The trap proper comprises a box or casing $a$ of wood or any other suitable material, the bottom of which has a rear extension $a'$ which ends with a vertical wall $a^2$. This extension serves as a rest for a removable receptacle to be hereinafter described.

The side walls of the casing $a$ have openings which are covered with screen or wire netting $b$ so that the presence of an animal in the receptacle can be easily detected. For the front opening $a^3$ of the casing a trap door $d$ is provided which is made of a curved metal plate and which is attached to a wire frame $d'$. This frame is suitably pivoted at $d^a$ in a partition $a^4$ provided in the interior of the casings and which divides the latter into two compartments $a^a$, $a^b$. The wire frame is extended into the rear compartment and has a plate $d^2$ attached to it, which extends substantially throughout the entire width and length of the rear compartment $a^b$ of the casing and forms one of the walks of the trap. The frame $d'$ with its rear walk $d^2$ is thus capable of swinging around its pivots. Pivotally secured at the lower end of the first compartment $a^a$ to swing vertically is a treadle $f$ which forms another walk and serves to release the trap door from a stop $g$ after the animal has entered the first compartment $a^a$. The stop $g$ is in form of an angular lever made of a bent wire and is pivoted at $g'$ in one of the side walls of the casing so that its upper arm normally is adapted to bear against the lower edge of the trap door, while the lower arm rests on the walk $f$, thus supporting the door in raised position. When the animal on entering the first compartment passes to the rear end of the walk $f$ the latter by the weight of the animal will swing downwardly, thereby swinging the stop $g$ upwardly and releasing the trap door which will swing downwardly closing the opening $a^3$. Simultaneously with the dropping down of the trap door, the rear walk $d^2$ will rise from its lowermost position.

Leading from the first compartment into the second compartment is an opening $a^5$ made in the partition wall $a^4$, which opening is obstructed by a plurality of freely and independently movable light arms $h$ slantingly arranged across the opening and suspended from a cross pin $h'$. The lower prong-shaped ends of these arms are adapted to normally rest on the bottom edge of the opening $a^5$. The animal in trying to escape from the trap will find passage to the second compartment $a^b$ through the obstructed opening $a^5$, the arms $h$ easily yielding under the pressure exerted by the animal. From this opening the animal will drop on to the raised walk whence it will be able to pass through an opening $a^6$ provided in the rear wall of the casing. This opening $a^6$ is adapted to lead into a receptacle $i$, as a glass bottle or the like, removably placed on the extension $a'$ so that its neck $i'$ is directed toward the opening $a^6$. On the outside of the rear wall of the casing lateral vertical guide grooves $a^7$, $a^7$ are provided to receive a plate $j$ which has a perforation conforming in size and shape with that of the rear opening $a^6$ and from which perforation projects a nozzle or tubular extension $k$ fixed to said plate and adapted to loosely fit in the neck $i$ of the receptacle or bottle $i$ and to project a short distance into the receptacle. The rear end of the cylindrical or tubular extension $k$ is open and is divided by a number of triangular incisions into prong-shaped parts $k'$. These prongs are bent inwardly to reduce the opening and at the same time to form obstructions preventing the animal from returning into the trap through said opening.

The bait $m$ may be placed between two wire nettings $l'$, $l''$ fixed in a frame $l$ which may be hinged at one of the side walls of the casing in form of a door.

When the mouse has been trapped in the receptacle $i$, the latter can be removed, by moving it upwardly together with the plate $j$. The receptacle can be then filled with water to drown the animal and on removing the nozzle $k$ from the bottle, the contents of the latter can be spilled out.

It will be seen that when the animal steps on the bridge $d^2$ it will by its own weight swing the bridge down and thereby again open the trap door.

What I claim and desire to secure by Letters Patent is:

1. In an animal trap, the combination with a casing having walks, a trap door in front and an opening in the rear wall, of a transparent receptacle having a neck directed toward the said rear opening, and a perforated plate extending across and removably connected to the rear wall of said casing and formed with an obstructing nozzle, said plate being interposed between the said casing and the transparent receptacle and its nozzle being adapted to project into the latter and to form a passage from said rear opening of the casing into the transparent receptacle.

2. In an animal trap, the combination with a casing having walks, a trap door in front and an opening in its rear wall, of a transparent receptacle having a neck directed toward the said rear opening, guides extending across the rear wall of said casing, a member removably borne in said guides and formed with an obstructed nozzle, said nozzle being adapted to extend through the neck into the said transparent receptacle and to form a passage leading from said rear opening into the said transparent receptacle.

In testimony whereof I affix my signature in presence of two witnesses.

CHARLES GOESSLER.

Witnesses:
 E. D. JUNIOR,
 D. KLEIN.

Copies of this patent may be obtained for five cents each, by addressing the "Commissioner of Patents, Washington, D. C."